United States Patent [19]

Desarmot et al.

[11] Patent Number: 4,690,738
[45] Date of Patent: Sep. 1, 1987

[54] METHOD OF ELECTROCHEMICALLY SURFACE TREATING CARBON FIBERS, FIBERS TREATED BY THE METHOD, AND COMPOSITE MATERIALS INCLUDING SUCH FIBERS

[75] Inventors: Georges Desarmot, Paris; Manuel Sanchez, Villiers Le Bel, both of France

[73] Assignee: Office National d'Etudes et de Recherches Aerospatiales, Chatillon, France

[21] Appl. No.: 733,227

[22] Filed: May 10, 1985

[30] Foreign Application Priority Data

May 18, 1984 [FR] France ............................... 84 07814

[51] Int. Cl.[4] .............................................. C25F 1/00
[52] U.S. Cl. .................................................. 204/130
[58] Field of Search ...................... 204/129.75, 129.85, 204/129.95, 130, 132

[56] References Cited

U.S. PATENT DOCUMENTS

| | | | |
|---|---|---|---|
| 3,776,829 | 12/1973 | Goan | 204/164 |
| 3,859,187 | 1/1975 | Druin | 204/130 |
| 3,865,705 | 2/1975 | Rieux | 204/130 |
| 4,234,398 | 11/1980 | Yamamoto | 204/130 |
| 4,401,533 | 8/1983 | Saito | 204/130 |

FOREIGN PATENT DOCUMENTS

| | | | |
|---|---|---|---|
| 3231243 | 3/1983 | Fed. Rep. of Germany | 204/130 |
| 7226999 | 7/1972 | Japan | 204/130 |
| 1433712 | 4/1976 | United Kingdom | 204/130 |

*Primary Examiner*—T. M. Tufariello
*Attorney, Agent, or Firm*—Karl F. Ross; Herbert Dubno

[57] ABSTRACT

A method of electrochemically surface-treating carbon fibers, fibers treated by the method, and composite materials including such fibers. The method consists in positively polarizing fibers relative to a cathode in an aqueous solution of an electrolyte constituted by a weak amino base. Nitrogen-containing groups are thus fixed to the surface of the fibers thereby improving the adhesion of the fibers to the resin in a composite material constituted by carbon fibers embedded in a synthetic resin matrix.

9 Claims, 10 Drawing Figures

METHOD OF ELECTROCHEMICALLY SURFACE TREATING CARBON FIBERS, FIBERS TREATED BY THE METHOD, AND COMPOSITE MATERIALS INCLUDING SUCH FIBERS

FIELD OF THE INVENTION

The invention relates to a method of electrochemically surface treating carbon fibers for improving the adherence of the fibers to the resin in a composite material constituted by carbon fibers embedded in a matrix of synthetic resin.

BACKGROUND OF THE INVENTION

Composite materials can be obtained by superposing sheets each of which is constituted by juxtaposing lengths of resin-impregnated roving, each length of roving comprising a large number of individual carbon fibers, and then by hardening the impregnating resin. The diameter of the fibers is about 10 microns.

When such a composite material is subjected to shear stresses, loss of cohesion is observed between the laminations beyond a certain stress value, i.e. the various layers of the material separate from one another. The higher the shear stress at which the laminations lose cohesion, and consequently the better the carbon fibers adhere to the resin, the better the mechanical properties of the material. However, excessive adhesion leads to a fragile material, i.e. a material lacking in impact strength.

Proposals have already been made to improve the adhesion of the fibers to the resin in which they are to be embedded by surface treating raw carbon fibers as fabricated either by chemical means or by electrochemical means. Chemical groups are thus produced on the surface of the fibers which encourage adhesion to resins mostly by creating fiber-to-matrix chemical bonds, but also to some extent by increasing Van der Waals interactions between the fiber and resin components.

Electrochemical treatments of this type are described, for example, in French patent application No. 2 477 593. They consist essentially in immersing the fibers in an electrolyte solution and in polarizing them positively relative to a cathode. Good adherence is obtained in particular by using sulfates and bisulfates of ammonia and sodium as the electrolyte, i.e. strong saline electrolytes.

These electrolytes include oxygenated anions and result in oxygenated groups being grafted onto the carbon fibers. These oxygenated groups improve adherence to synthetic resins, but the method of treatment may, under certain circumstances, lead to the mechanical properties of the carbon fibers being degraded.

This French Application also mentions tests performed using strong acids and bases as the electrolyte (sulfuric acid, phosphoric acid, sodium hydroxide). As a result it is observed that either the hardening of the impregnating resin in which the fibers are later incorporated is inhibited, or else the treated fiber's resistance to oxidation is poor.

OBJECTS OF THE INVENTION

The principal object of the invention is to provide an improved method of effecting the desired degree of adhesion and is achieved by grafting non-oxygenated groups to the surface of the carbon fibers instead of oxygenated groups as proposed previously.

Another object of the invention is to provide a method of grafting groups suitable for forming strong bonds with amine-hardenable epoxy resins, which resins are frequently used as an organic matrix in composite materials that are reinforced by carbon fibers.

SUMMARY OF THE INVENTION

The invention provides a method of surface treating carbon fibers in which the fibers are put into contact with an aqueous solution of an electrolyte in the form of a weak amino base while being positively polarized relative to a cathode.

Weak bases are defined as bases which on dissolving give rise to the dissociation of not more than about one molecule per $10^3$ dissolved molecules, corresponding to a degree of dissociation of less than about $10^{-3}$.

In spite of this low degree of dissociation which, a priori, would appear not to predispose them to act as electrolytes in electrochemical processes, weak amino bases give rise, quite unexpectedly, to excellent results when used as electrolytes in the electrochemical treatment of the invention.

Amino bases are distinguished by the presence of carbon-nitrogen bonds in their molecules. They comprise compounds of basic character having a primary, secondary or tertiary amine function, or other nitrogen functions such as an amide function.

The method in accordance with the invention fixes nitrogen atoms onto the surface carbon atoms of the fibers, in particular in the form of $-NH_2$ groups.

Preferably, the treatment is performed with insufficient polarization to cause appreciable oxygen evolution. It is observed that the nascent oxygen evolved by electrolysis, whose oxidizing activity is well known, encourages the fixing of oxygenated groups on the fibers. Good results are generally obtained by polarizing the fibers to a potential which does not exceed $+1.7$ volts relative to a saturated calomel reference electrode, with said potential being advantageously chosen to be about $+1.5$ volts.

The invention also provides carbon fiber obtained by the above-defined treatment method, together with composite materials reinforced by such fibers.

BRIEF DESCRIPTION OF THE DRAWING

The invention will be better understood from the following detailed description given by way of non-limiting illustration with reference to the accompanying drawing in which.

SPECIFIC DESCRIPTION

Figure 1:
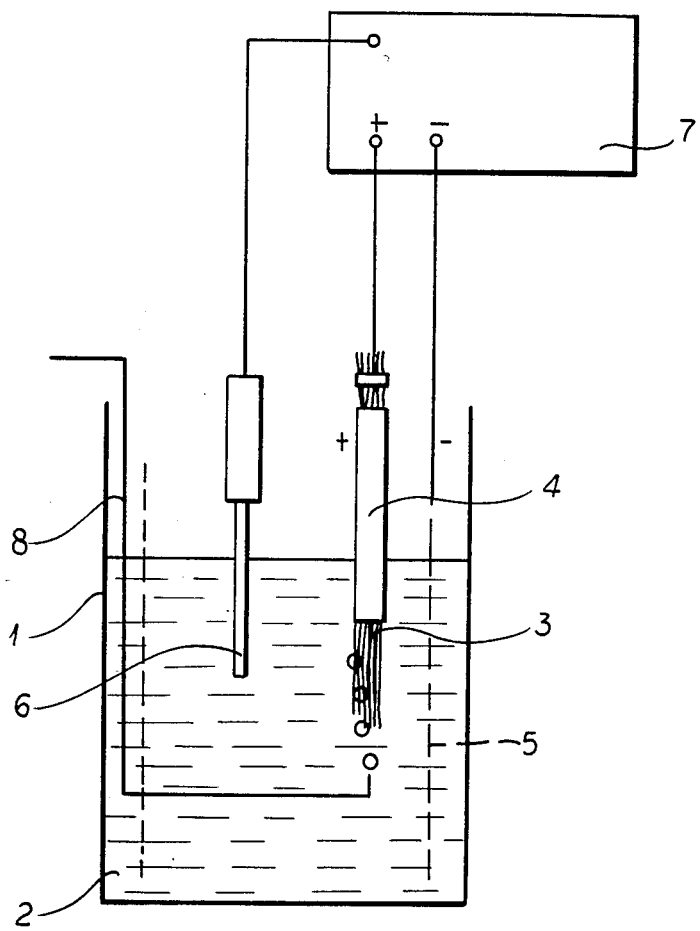
FIG. 1 is a diagram of laboratory apparatus for performing the method.

In the experimental apparatus shown diagrammatically in FIG. 1, a tank 1 contains a solution of electrolyte 2 in which a bundle of carbon fibers 3 is immersed, said fibers constituting an anode and being partially received in an insulating support 4. The anode, together with a platinum cathode 5 and a saturated calomel reference electrode 6 which are also immersed in the solution 2 are connected to a constant voltage source 7 which maintains a voltage of predetermined value between the anode and the reference electrode. This predetermined value is selected in such a manner as to avoid oxygen evolving by electrolysis on the anode.

Argon is delivered via a pipe 8 which opens out beneath the fibers 3 to bubble through the bath. This prevents dissolved oxygen being present in the bath.

The electrolytic bath 2 is an aqueous solution of a weak amino base. The electrochemical reactions which take place at the interface between the solution and the fibers 3 have the effect of fixing nitrogen groups to the surface of the fibers, without attacking the fibers chemically and consequently without the fibers losing any mass.

Figure 2:
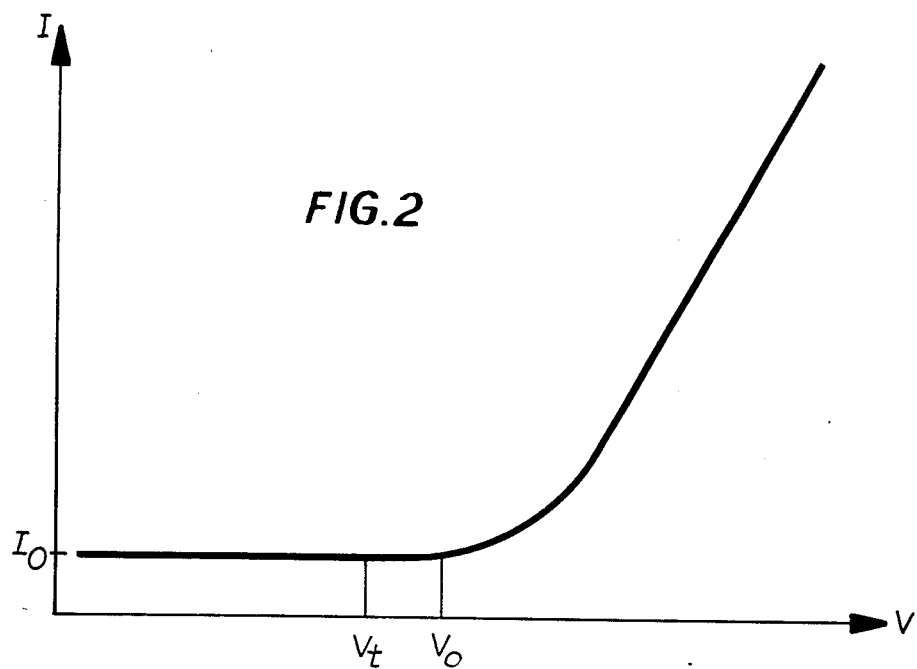
FIG. 2 is a characteristic curve showing the change in current as a function of fiber potential.

The curve in FIG. 2 shows the variation of the current I passing through the anode as a function of the potential V thereof relative to the reference electrode. When the potential is low enough, no oxygen is evolved and the current has a value $I_O$ which is independent of the potential. At higher values the current increases rapidly with potential following a curvilinear portion of the curve. The working potential $V_t$ is chosen to have a high value, but to be less than a value $V_O$ at which the curve begins to move away from the horizontal $I_O$ line, i.e. the point where oxygen begins to be evolved. In the following example, $V_O$ is generally about 1.7 volts and a working potential $V_t$ of about 1.5 volts may be selected which is then in the horizontal portion of the curve. There is no advantage in chosing a value which is substantially smaller since that would slow down the electrochemical process.

In order to determine the adherence of carbon fibers to a resin, one end of a fragment of a single fiber is inserted into the moving jaw of a traction machine and is bound thereto by a drop of solder, and the other end is embedded in resin over a distance which is short enough to ensure that the force required to pull the fiber out of the resin is less than the breaking force of the fiber. The extraction force $F_a$ is measured by means of the traction machine, and the critical interface shear stress $\sigma_a$ at which the fiber loses cohesion with the resin is deduced by means of the formula:

$$\sigma_a = F_a/pl$$

where p is the perimeter of the fiber cross section and l is the length of fiber embedded in resin, said distances being measured by means of a scanning electron microscope of calibrated magnification. $\sigma_a$ thus characterizes the adherence of the fiber to the resin and the shear-withstanding capability of the fiber-resin interface.

The mechanical properties in traction of a fiber are also measured in conventional manner, i.e. its Young's modulus E, its ultimate tensile strength $\sigma_c$, and its breaking strain $\epsilon_c$.

Figure 3:
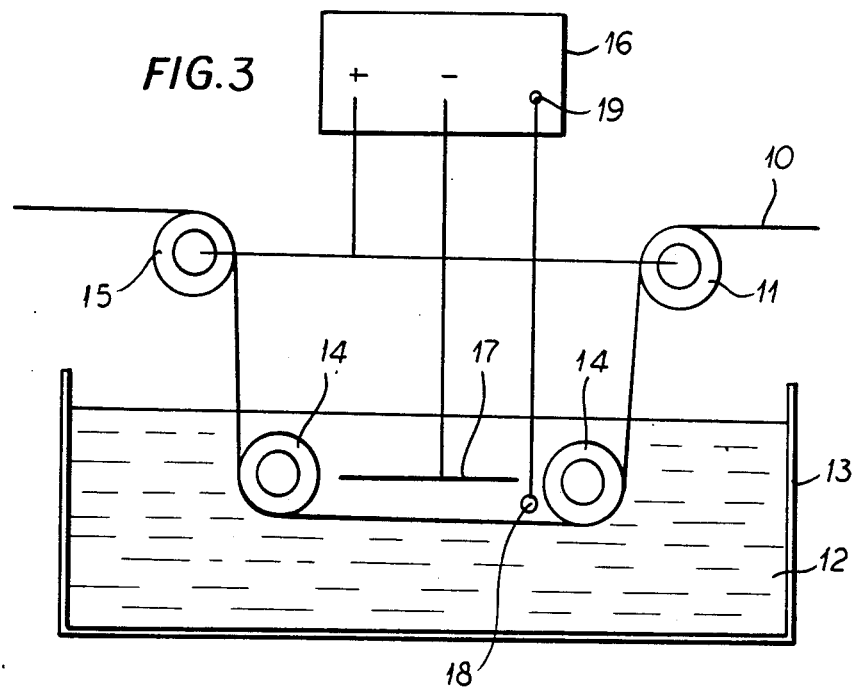
FIG. 3 is a diagram of an industrial installation for implementing the method.

An installation for continuous fiber processing is shown diagrammatically in FIG. 3. A continuous fiber roving 10 constituted by a multitude of carbon fibers is unwound from a reel (not shown), passes over a roll 11 situated above an electrolyte bath 12 contained in a tank 13 and then successively round two rolls 14 immersed in the bath 12 and finally over a roll 15 situated above the bath prior to being taken up on a take-up reel (not shown). The roll 15 (and optionally other rolls) is rotated by means not shown in such a manner that the thread 10 advances continuously. The rolls 11 and 15 are connected to a positive output terminal from a constant voltage supply 16 whose negative terminal is connected to a stainless steel cathode 17 immersed in the solution 12 so as to polarize the thread 10 positively relative to the cathode. A calomel reference electrode 18 is connected to a control terminal 19 of the constant voltage supply 16 thereby enabling the anode potential to be fixed at a desired value relative to the reference electrode. This installation performs the same type of treatment as the apparatus shown in FIG. 1, but does so continuously.

The following examples show the results obtained by the treatment in accordance with the invention.

EXAMPLE 1

HT type carbon fibers produced by Courtaulds Limited were treated by means of the FIG. 1 apparatus in which the electrolyte bath was an aqueous solution of hexamethylenetetramine at 50 grams (g) per liter, $pK_b = 8.85$, $pH \simeq 8.62$, and the fiber potential was +1.45 volts relative to the reference electrode. The corresponding current density on the surface of the fibers was about 0.2 amperes/square meter. The treatment was effected at a temperature of 20° C.

The test pieces for measuring the interface shear stress were made using Araldite LY 556 resin together with hardener HT 972, the resin was hardened for 16 hours at 60° C. and then for 2 hours at 140° C.

Non-treated fibers had the following characteristics:
Interface shear stress: $\sigma_a = (24 \pm 2)$ MPa
Young's modulus: $E = (251 \pm 5)$ GPa
Ultimate tensile strength: $\sigma_c = (2.60 \pm 0.22)$ GPa
Breaking strain: $\epsilon_c = (1.03 \pm 08)$ %
Average surface area of fiber section: $S = (45 \pm 1.9)$ $\mu m^2$
(Test piece length: 11.9 mm).

Except where otherwise indicated, all measured characteristics are given with a confidence interval of 68%.

Table 1 shows the pulling out stress $\sigma_a$ for different treatment periods, and the corresponding quantity of electricity consumed.

TABLE 1

| Treatment time in minutes | Pulling out stress $\sigma_a$ in MPa | Quantity of electricity consumed in Cb/g |
|---|---|---|
| 3 | (37.5 ± 2.9) | 11 |
| 10 | (56 ± 2.8) | 36 |
| 60 | (67 ± 1.5) | 216 |

The mechanical and physical characteristics of the fibers were measured again after 60 minutes of treatment. The results were as follows:
$E = (246 \pm 3.5)$ GPa
$\sigma_c = (2.79 \pm 0.16)$ GPa
$\epsilon_c = (1.13 \pm 0.07)$ %
$S = (45 \pm 1)$ $\mu m^2$ A considerable increase in the stress $\sigma_a$ at which cohesion is lost can be observed.

Ten minutes of treatment suffices to obtain a value which is substantially identical to the value (57±3 MPa) presented by a commercially available treated fiber sold by Torayca under the reference T 300 and which has oxygenated groups on its surface.

The value obtained after 60 minutes of treatment is significantly greater than that of commercially available fibers.

These results are obtained without degrading the chemical properties of the fibers and without significant loss of material, in addition energy consumption is low because substantially no water is electrolyzed.

EXAMPLE 2

The example 1 procedure was performed except that the anode potential was reduced to +1.2 volts relative to the reference electrode. The value of $\sigma_a$ reached after one hour of treatment was $$\sigma_a = (43 \pm 4.0) \text{ MPa}$$

instead of $(67 \pm 1.5)$ MPa obtained at +1.45 volts.

This shows that it is not advantageous to reduce the anode potential too far.

EXAMPLE 3

The procedure of examples 1 and 2 was repeated except that the anode potential was raised to +2 volts, i.e. above the threshold at which oxygen is evolved. After 15 minutes of treatment, $$\sigma_a = (50 \pm 10) \text{ MPa}$$

was obtained, i.e. the average value was less than that obtained after 10 minutes of treatment in example 1 and the dispersion was greater. The current density was greater (0.75 A/m$^2$) and the fibers were oxidized.

EXAMPLES 4 TO 6

Treatments were performed using amino bases other than hexamethylenetetramine as the electrolyte.

The apparatus used, the treatment temperature, the starting fibers and the conditions under which the interface shear stress were measured were all the same as for example 1.

The treatment conditions and the resulting values of $\sigma_a$ after 10 minutes of treatment are shown in Table 2 opposite the corresponding values of example 1.

The bases used in examples 4 and 5, as for example 1, were bases having very low dissociation, and the current-voltage curve is substantially identical to that for example 1. The adherence results obtained are likewise entirely comparable to those of example 1.

Isopropylamine as used in example 6, is a base with higher dissociation than the dissociation of the bases used in the other examples, and this substantially reduces the threshold at which oxygen is evolved because of a non-negligible concentration of OH$^-$ ions in the solution. This leads to using a lower anode potential, and the improvement in interface shear stress is relatively small.

FIGS. 4 to 7 show the results of analyses for the elements present on the surface of the fibers.

FIGS. 4a to 5c are electron spectra obtained by the ESCA process (electron spectroscopy for chemical analysis) which consists in irradiating the sample to be analyzed with X-rays and measuring the intensity of secondary electron emission as a function of energy. Energy is plotted along the X axis in electron volts and intensity is plotted up the Y axis in arbitrary units.

Figure 4A:
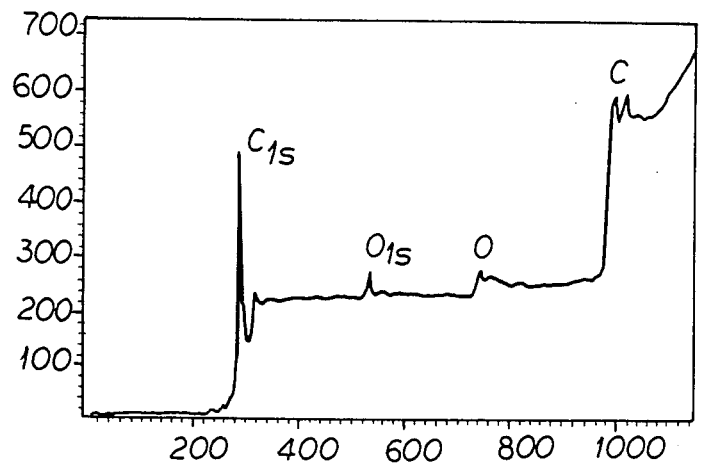
FIGS. 4a and 4b are spectra obtained by electron spectrography on non-treated fibers.

FIG. 4a relates to the Courtaulds fibers and shows a large peak reference $C_{1s}$ indicative of a major presence of carbon atoms, and a small peak reference $O_{1s}$ indicating the presence of a small quantity of oxygen. Two other, broader, C and O peaks have the same meanings as the peaks $C_{1s}$ and $O_{1s}$.

Figure 4B:
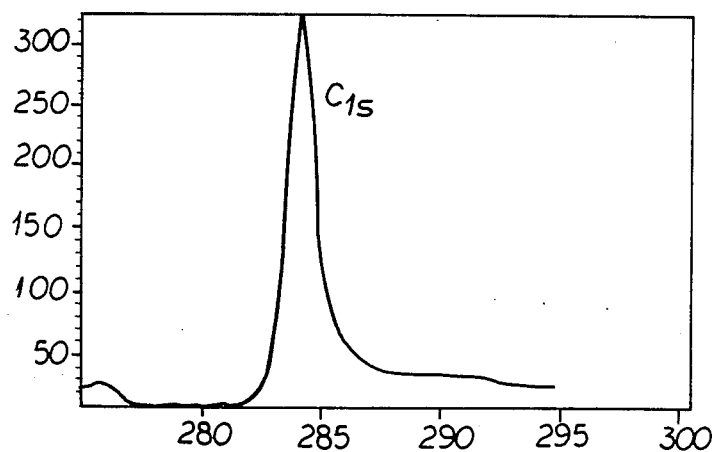

FIG. 4b is a partial spectrum showing the carbon $C_{1s}$ peak on a larger scale.

Figure 5A:
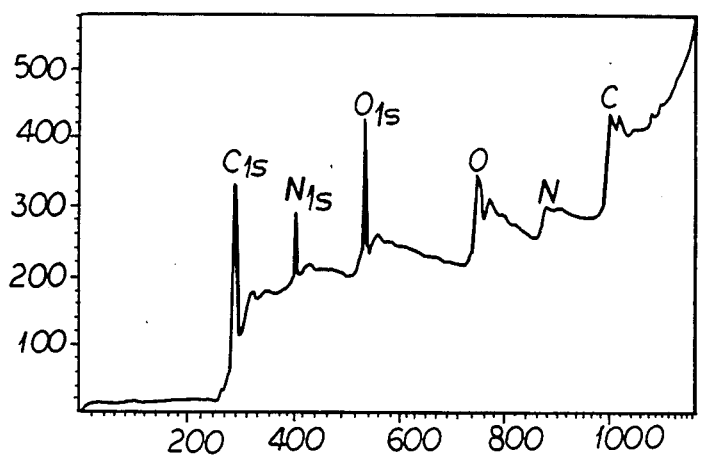
FIGS. 5a to 5c are spectra obtained by electron spectrography on treated fibers.

FIG. 5a is an analogous spectrum to FIG. 4a and relates to fibers treated by the method of example 1 above. It can be seen that the carbon peaks are reduced, that the oxygen peaks are raised, and that peak $N_{1s}$ and N have appeared demonstrating the presence of nitrogen atoms.

Figure 5B:
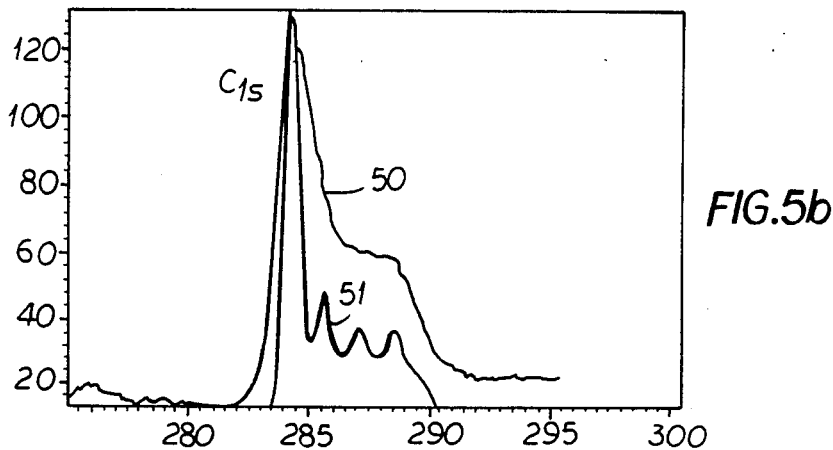

FIG. 5b has a curve 50 which is analogous to the FIG. 4b spectrum for fibers treated in accordance with example 1, and a curve 51 which is a computer-generated deconvolution of the $C_{1s}$ peak formed by the curve 50. The curve 51 has secondary peaks indicative of the presence of carbon atoms engaged in bonds other than C—C bonds, and in particular in C—NH$_2$ bonds.

Figure 5C:
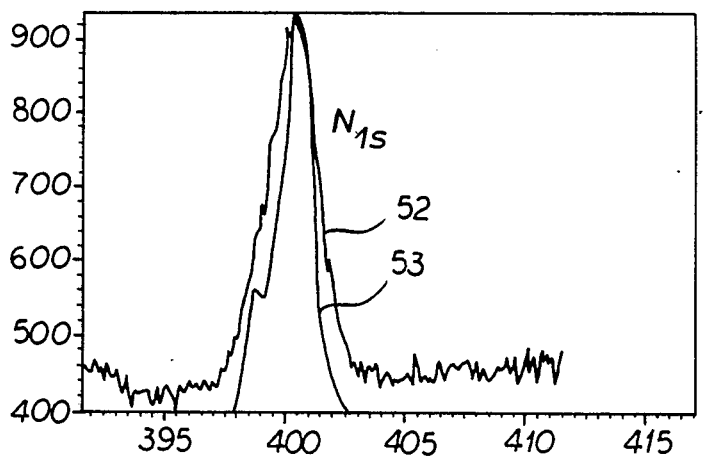

FIG. 5c shows a partial spectrum (curve 52) analogous to FIG. 5b but centered on the $N_{1s}$ peak. The deconvolution curve 53 confirms the presence of NH$_2$ groups bonded to carbon atoms.

Figure 6:
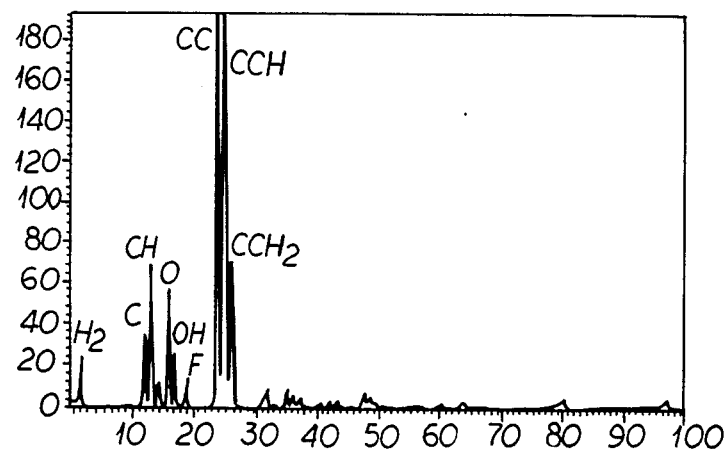
FIG. 6 is a spectrum obtained by mass spectrography of secondary ions on non-treated fibers.
Figure 7:
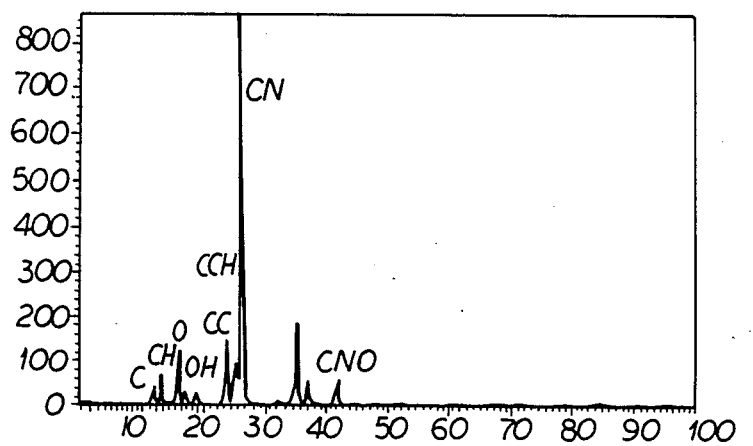
FIG. 7 is a spectrum analagous to FIG. 6, corresponding to treated fibers.

FIGS. 6 and 7 are negative ion mass spectra obtained by the SIMS method (Secondary Ion Mass Spectroscopy), with the number of secondary ions plotted along the Y axis in arbitrary units as a function of the mass of said ions plotted along the X axis. Each of the peaks is marked with the most probable atom or group of atoms having the corresponding mass.

It can be seen in FIG. 7 which relates to treated fibers that the peak corresponding to a mass of 26 is spectacularly increased, thereby showing the appearance of CN groups next to a small quantity of CCH$_2$ groups.

This result confirms the observations made by electron spectrography, and demonstrates the presence of NH$_2$ groups bound to carbon atoms on the surface of the treated fibers.

The treated fibers obtained in accordance with the invention are particularly suitable for manufacturing composite materials using epoxy resin hardened by amines as matrix material.

The fabrication of composite materials using fibers treated in accordance with the invention is no different from the manufacture of composite materials using fibers treated by other known methods.

TABLE 2

| Example | 1 | 4 | 5 | 6 |
|---|---|---|---|---|
| Electrolyte | Hexamethylenetetramine | 6-amino-2-methylpyridine | Urea | Isopropylamine |
| Concentration (g/l) | 50 | 25 | 50 | 25 |
| pK$_b$ | 8.85 | 8.0 | 13.8 | 1.95 |
| pH | 8.62 | 10.06 | 7.42 | 12.2 |
| Anode potential V$_t$ (V) | 1.45 | 1.5 | 1.5 | 0.5 |
| Oxygen evolution threshold V$_o$ (V) | 1.7 | 1.7 | 1.7 | 0.6–0.7 |
| Current density (A/m$^2$) | 0.2 | 4 | 0.4 | 0.04 |
| Quantity of electricity consumed (Cb/g) | 36 | 750 | 75 | 6.5 |

TABLE 2-continued

| Example | 1 | 4 | 5 | 6 |
|---|---|---|---|---|
| $\sigma_a$ (MPa) | 56 ± 2.8 | 58 ± 3 | 58 ± 4.5 | 30.5 ± 2.5 |

We claim:

1. A method of treating the surface of carbon fibers to render them adherent to a synthetic resin comprising putting the fibers into contact with an aqueous solution of a basic electrolyte selected from the group comprising amine compounds and amide compounds having a dissociation degree of less than about $10^{-3}$, and polarizing the fibers in said electrolyte positively relative to a cathode at a potential not exceeding 1.7 volts relative to a saturated calomel reference electrode in said electrolytes.

2. The method defined in claim 1 wherein the basic electrolyte is at least one compound selected from the group which consists of hexamethylenetetramine, 6-amino-2-methylpyridine, urea and isopropylamine.

3. The method defined in claim 2 wherein said potential is about 1.5 volts relative to said saturated calomel reference electrode.

4. The method defined in claim 3 wherein said electrolyte is hexamethylenetetramine.

5. The method defined in claim 3 wherein the electrolyte is 6-amino-2-methyl-pyridine.

6. The method defined in claim 3 wherein said electrolyte is urea.

7. A carbon fiber treated by the method defined in claim 1.

8. A composite material containing the carbon fiber defined in claim 7 bonded to a synthetic resin.

9. The composite material defined in claim 8 wherein said synthetic resin is an amine-hardened epoxy resin.

* * * * *